March 21, 1939.      G. MEYER      2,151,132
CHANGE SPEED GEAR
Filed May 6, 1936      2 Sheets-Sheet 1

Inventor. Gustav Meyer
By Watson, Coit, Mace & Grindle
Attys.

March 21, 1939.  G. MEYER  2,151,132
CHANGE SPEED GEAR
Filed May 6, 1936  2 Sheets-Sheet 2

Inventor: Gustav Meyer

Patented Mar. 21, 1939

2,151,132

UNITED STATES PATENT OFFICE 2,151,132

CHANGE SPEED GEAR

Gustav Meyer, Friedrichshafen-on-the-Bodensee, Germany, assignor to Maybach-Motorenbau Gesellschaft mit beschrankter Haftung, Friedrichshafen-on-the-Bodensee, Germany, a corporation of Germany Application May 6, 1936, Serial No. 78,243
In Germany May 16, 1935

14 Claims. (Cl. 74—359)

In the known change speed gears of the kind comprising a train of mainshaft parts and a train of layshaft parts, dog clutches for coupling together the parts of the said trains, and a number of pairs of obliquely toothed gear wheels in constant mesh, one wheel of each pair being mounted on one of the mainshaft parts and the other on one of the layshaft parts, considerable difficulties arise with regard to taking up the axial thrusts of the gear wheels which are mounted on the intermediate parts of the shaft trains. Since in the interests of reducing manufacturing cost and overall length, and therefore weight of the gearbox, it is not desirable to provide thrust bearings on each side of each of the intermediate gear wheels, it follows that the thrusts from these gear wheels must be transmitted through the intermediate parts of the shaft trains to thrust-absorbing bearings provided at the ends of the said trains. Roller bearings are generally employed between the various parts of the shaft trains, and if these bearings are subjected, while they are running, to the heavy axial thrusts which originate from the gear wheels, rapid wear occurs, leading after a certain time of running, to injuries to the bearings, unsteady running of the gear and even to fracture of shaft elements and other parts.

According to the invention, the aforesaid difficulties are obviated in a simple way by the direction of the obliquity of the teeth of the gear wheels mounted on intermediate parts of the shaft trains, and by the construction of the bearings provided between the parts of the shaft trains being such that the axial thrusts produced by the transmission of the power of the driving engine are transmitted by bearings between shaft parts which do not make any relative movement with respect to each other while the thrust is acting on them.

Two change speed gears constructed according to the principles of the invention are shown in the accompanying drawings.

Figure 1:
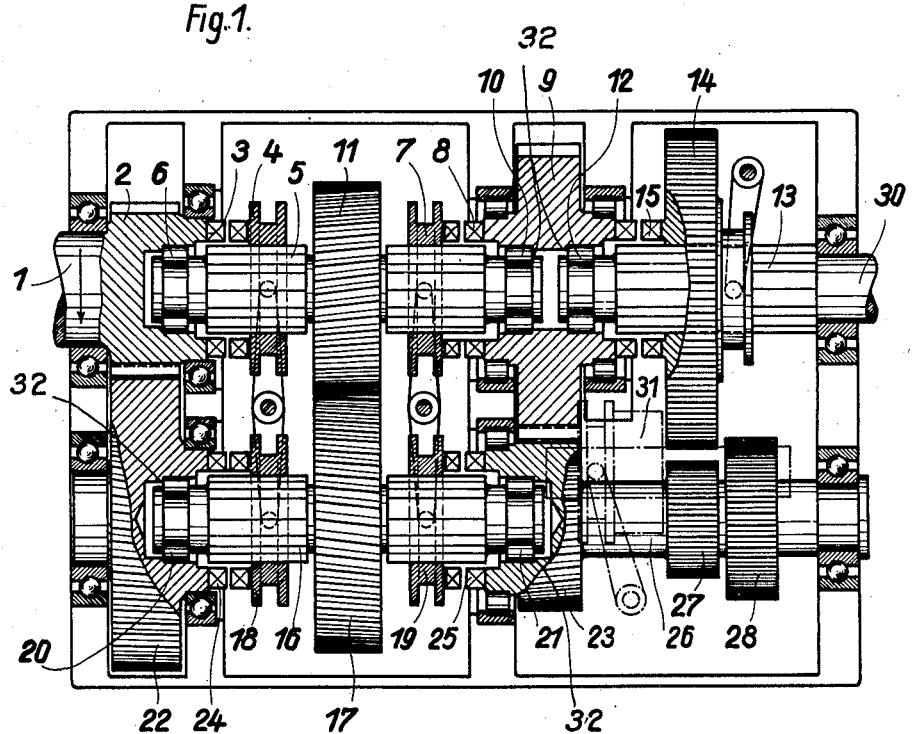
Figure 1 shows the first of these change speed gears in part axial section and part elevation.

The change speed gear shown in Figure 1 comprises a mainshaft train of four parts, namely the driving shaft 1, the shaft 5, the hub portion of the gear wheel 9, and the driven shaft 13. It should be particularly noted that although the hub portion of the gear wheel 9 is hollow and very short, it is functionally one of the parts of the mainshaft train and is so regarded in the following description and in the appended claims. Similarly the layshaft train is considered to be comprised of three parts—the short shaft of the gear wheel 22, the shaft 16, and the shaft 26.

Mounted on the driving shaft 1 is a gear wheel 2 which has oblique teeth and is supported at both sides by ball bearings and on one side is provided with dogs 3 for a dog clutch 4 slidably mounted on the shaft element 5. In a recess formed in the end of the driving shaft 1, the shaft element 5 is mounted in a roller bearing 6. On the other end of the shaft element 5 there is likewise a dog clutch 7 adapted to be brought into engagement with dogs 8 formed on the hub of the gear wheel 9. This end of the shaft element 5 also carries a roller bearing 10 by means whereof the said shaft element is mounted in a recess in the hub of the gear wheel 9. Between the two dog clutches 4 and 7 is a gear wheel 11 with oblique teeth, the angle of the oblique teeth being directed so as to be contrary to the direction of rotation (seen from the driving side); in this case, the teeth of the gear wheel 11 are left-hand helices for right-hand (clockwise) rotation of the shaft 1.

In the hub of the gear wheel 9, the shaft element 13 is also mounted in a roller bearing 12, and mounted on the said shaft element 13 is a slidable gear wheel 14 carrying a dog clutch 15. The power of the driving engine is transmitted through the shaft element 13 to the driving shaft 30 leading to the driven wheels of the vehicle.

The obliquely toothed gear wheel 22 of the layshaft train is in constant mesh with the gear wheel 2 of the mainshaft train and is mounted on both sides in ball bearings. The hub of this gear wheel has a recess into which projects one end of the shaft 16, a roller bearing 20 being provided between the two parts. The other end of the shaft 16 projects similarly into a recess provided in the end of the shaft 26, with the interposition of a roller bearing 21. The shaft 16 furthermore carries a gear wheel 17 constantly in mesh with the gear wheel 11 and slidable dog clutches 18 and 19 adapted to engage dogs 24 and 25 respectively provided on the hub of the gear wheel 22 and on the end of the shaft 26. The shaft 26 also carries an obliquely toothed gear wheel 23 constantly in mesh with the gear wheel 9 and two gear wheels 27 and 28 with straight spur teeth.

All the roller bearings 6, 10, 12, 20, 21 are so constructed that there is only one shoulder 32 in the recess in which the rollers run, the shoulders being arranged so that the bearings are capable of transmitting axial thrusts corresponding to compression of the shaft part 5 or 16 or of the hub of the gear wheel 9 but not thrusts in the reverse direction. In the event of slight displacements resulting from axial thrusts, the shaft element can thus bear in the direction of the effective thrust in the corresponding bearing without the production of stress on a shoulder in the bearing mounted on the other end of the shaft element.

Such a gear operates as follows:

In the first speed, the power is transmitted from the shaft 1 through the gear wheel 2, gear wheel 22, clutch 24—18, shaft element 16, clutch 19—25, shaft element 26, gear wheels 28, 14 to the driven shaft 30.

When travelling in second speed, the transmission of power takes place from the shaft 1 through the gear wheels 2 and 22, clutch 24—18, shaft element 16, clutch 19—25, the gear wheels 23 and 9, the clutch 15 and shaft element 13 to the driven shaft 30.

The axial thrusts of the gear wheels 2 and 22 and also 9 and 23 occurring at these two speeds are taken up by the bearings provided for these wheels directly in the casing. Since in the first and second speeds, no power is transmitted by the gear wheels 11 and 17, these latter also do not give rise to any appreciable axial thrusts.

When the third speed is engaged, the power is transmitted from the shaft 1 through the dog clutch 3—4 to the shaft element 5 and thence through the gear wheels 11 and 17 to the shaft element 16 and through the clutch 19—25 and the gear wheels 23, 9, clutch 15 and the shaft element 13 to the driven shaft 30. Due to the obliquities of the teeth of the gear wheels 11 and 17 an axial thrust acts towards and upon the roller bearing 6 of the shaft element 5 and the roller bearing 21 of the shaft element 16. Since the clutch 3—4 is engaged, however, the roller bearing 6 is stationary relatively to the gear wheel 2 or the shaft element 5. The rollers of the bearing 6 therefore transmit this thrust without rotating relatively to the bearing races. The same applies to the roller bearing 21. Due to the engagement of the clutch 19—25, this latter bearing also is stationary relatively to the gear wheel 23 or the shaft element 16, while it transmits the axial thrust of the gear wheel 17 through the end faces of the rollers to the shoulder of the wheel hub race.

In the fourth speed, the transmission of power takes place through the gear wheels 2, 22, 17, 11. In this case, there is a thrust from the gear wheel 17 towards the roller bearing 20 which is transmitted by the said bearing to the hub of the gear wheel 22. The dog clutch 18—24 is engaged, so the bearing parts of 20 do not make any relative movement. The roller bearing 10 is also stationary, due to the engaged dog clutch 7—8, and transmits to the shoulder of the hub race of the gear wheel 9 the axial thrust which is directed from the gear wheel 11 towards the bearing 10.

In the fifth speed, the dog clutches 3—4 and 7—8 and 15 are engaged. Without the parts of the roller bearings 6, 10, 12 making any relative rotary movements, the power is transmitted directly from the shaft 1 through the clutches 3—4, 7—8 and 15 to the driven shaft 30, no appreciable axial pressures being produced since power is not transmitted by any of the gear wheels.

The following table shows the running condition of the bearings for the different speeds.

*Running condition of the bearings of the shaft elements 5 and 16 for the different speeds*

| Bearing | 6 | 20 | 21 | 10 |
|---|---|---|---|---|
| Speed: | | | | |
| I | Runs (without pressure) | Stationary | Stationary | Runs (without pressure). |
| II | Runs (without pressure) | Stationary | Stationary | Runs (without pressure). |
| III | Stationary (with axial thrust) | Runs (without pressure) | Stationary (with pressure) | Runs (without pressure). |
| IV | Runs (without pressure) | Stationary (with pressure) | Runs (without pressure) | Stationary (with pressure). |
| V | Stationary (without pressure) | Runs (without pressure) | Runs (without pressure) | Stationary (without pressure). |

After cutting off the engine fuel supply, that is to say, when the gear is being driven by the vehicle wheels, the direction of the axial thrust for the various speeds is the converse of that described hereinbefore. In this case, the axial thrust is taken partly by bearings which are in motion. Since, however, the power transmitted in this case is substantially lower, the wear on the bearings concerned is only slight. The gear wheel 27 is for the reverse speed which is obtained in known manner by means of an intermediate gear wheel 31 (shown in chain lines in the drawings) between the two gear wheels 27 and 14.

Figure 3:
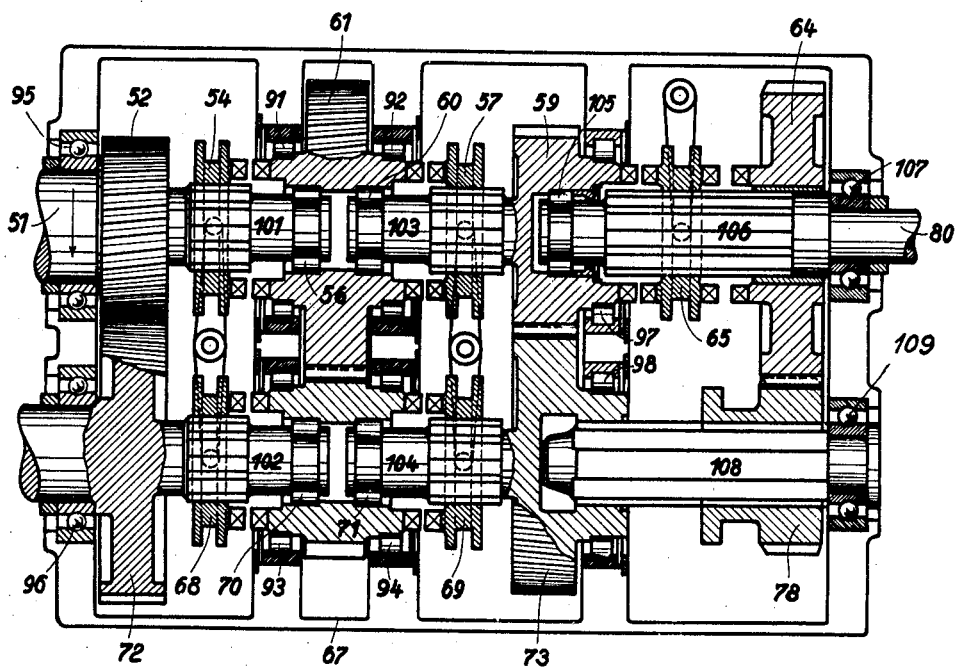
Figure 3 shows the other change speed gear in part axial section and part elevation.

In the change speed gear shown in Figure 3 the mainshaft train is composed of the shaft 101, hub of the gear wheel 61, shaft 103, and shaft 106, and the layshaft train is composed of the shaft 102, hub of the gear wheel 67, and shaft 104, 108.

The shaft 101 is an extension of the shaft 51 to which the power of the engine is applied and is carried at one end in a thrust-absorbing bearing 95 and at the other end in a roller bearing 56 running in a recess in the hub of the gear wheel 61. One end of the shaft 103 is similarly carried in a roller bearing 60 running in a recess in the hub of the gear wheel 61, and the other end is provided with a recess in which runs a roller bearing 105 supporting one end of the shaft 106. The other end of the shaft 106 is carried in a thrust-absorbing bearing 107.

Of the layshaft train the shaft 102 is carried at one end in a thrust-absorbing bearing 96 and at the other end in a roller bearing 70 running in a recess in the hub of the gear wheel 67. One end of the shaft 104, 108 is similarly carried in a roller bearing 71 running in a recess in the hub of the gear wheel 67, and the other end is carried in a thrust-absorbing bearing 109. The roller bearings 56, 60, 105, 70 and 71 are formed, like the corresponding bearings in Figure 1, with only one shoulder on their recesses, so that they can only transmit axial thrusts corresponding to compression of the shaft parts.

Dog clutches 54, 57, 65, 68 and 69 are provided for coupling together the parts of the mainshaft and layshaft trains.

Obliquely toothed gear wheels 52 and 59 are mounted on the parts 101 and 103 of the mainshaft train and are in constant mesh with gear wheels 72 and 73 mounted on the parts 102 and 104 of the layshaft train. The gear wheels 61 and 67 also have oblique teeth and are in constant mesh with one another. A straight toothed spur wheel 64 is mounted on the shaft 106 and has dogs adapted to engage with one of the sets of dogs provided on the dog clutch 65. On the layshaft part 108 there is also mounted a sliding spur wheel 78 adapted to be brought into mesh with the gear wheel 64. The radial forces of the gear wheels 61, 67, 59 and 73 are taken by roller bearings 91, 92, 93, 94, 97 and 98 mounted in the casing.

The directions of the teeth of the gear wheels 61, 67, 59 and 73 are chosen in accordance with the principle explained in connection with Figure 1. That is to say, for clockwise rotation of the driving shaft 1 the teeth of the wheels 61 and 59 are left hand helices, and the teeth of the wheels 67 and 73 are (necessarily) right hand helices. It then follows that when the wheels are rotating in their normal directions and one of the mainshaft wheels (61 or 59) is the driving wheel of its pair its thrust is transmitted from the shaft element on which it is mounted only to the adjacent shaft element which is nearer the end of the change speed gear intended to receive the normal driving torque. Conversely the transmission of the thrusts of the driven wheels is in the opposite direction. These directions in each case provide for the transmission of the thrust through the roller bearings which are stationary.

At the first speed the torque is transmitted from the shaft 51 through the gear wheels 52 and 72, the clutch 68, gear wheel 67, gear wheel 61, clutch 57, gear wheel 59, gear wheel 73, gear wheel 78 and gear wheel 64, the right end clutch of the sleeve 65, and the shaft element 106 to the driven shaft 80.

With the second speed engaged the transmission of power takes place from the shaft 51 through the gear wheels 52 and 72, clutch 68, gear wheel 67, clutch 69, gear wheel 78, gear wheel 64, the right end clutch of the sleeve 65, and the shaft element 106 to the driven shaft 80; third speed: shaft 51 through gear wheels 52 and 72, clutch 68, gear wheel 67, gear wheel 61, clutch 57, clutches 65 to shaft 80; fourth speed: shaft 51, gear wheel 52, gear wheel 72, clutch 68, gear wheel 67, clutch 69, gear wheel 73, gear wheel 59, clutch 65 to shaft 80; fifth speed: shaft 51 through shaft element 101, clutch 54, gear wheel 61, clutch 57, shaft element 103, gear wheel 59, clutch 65 to driven shaft 80; sixth speed: shaft 51, shaft element 101, clutch 54, gear wheel 61, gear wheel 67, clutch 69, gear wheel 73, gear wheel 59, clutch 65 to the driven shaft 80.

With the third speed engaged, whereby the clutch 68 is engaged at the gear wheel 67 and the clutch 57 at the gear wheel 61 and the clutch 65 at the gear wheel 59, the axial thrust of the gear wheel 67 is transmitted by the bearing 70 to the shaft element 102 and by the body of the gear wheel 72 to the end bearing 96. The axial thrust of the gear wheel 61 is transmitted by the bearing 60 on the shaft element 103 and by the body of the gear wheel 59 through the bearing 105 on the shaft element 106 from where it is transmitted to the end bearing 107. There is no relative movement of the rollers of bearings 70, 60 and 105 vis-a-vis their bearing surfaces since the clutches 68, 57 and 65 do not allow any relative rotary movement of the said bearings.

Figure 2:
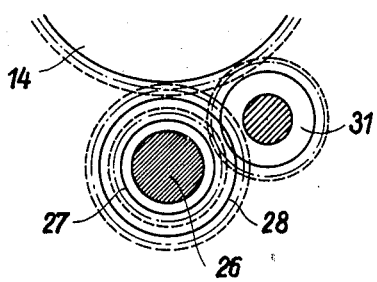
Figure 2 shows diagrammatically in cross section the arrangement of the reverse speed gear wheels of the change speed gear shown in Figure 1.

The gear wheels 64 and 78 are spur wheels. The gear wheel 64 can be brought into connection with the shaft element 106 by means of twin clutch 65. The gear wheel 78 can be disengaged from the gear wheel 64 thereby obtaining the reverse speed by means of an intermediate wheel of the known type, in the same way as shown on Fig. 2 for the gear of Fig. 1, for instance by transmitting the torque from shaft 51 through the gear wheels 52 and 72, the shaft element 102, the clutch 68, the gear wheels 67 and 61, the clutch 57, the shaft element 103, the gear wheels 59 and 73, the shaft element 108, the wheel 78, an intermediate gear wheel 31 (Fig. 2), the gear wheel 64, the right end clutch of the sleeve 65, and the shaft element 106 on the shaft 80.

I claim:

1. In a change speed gear: a mainshaft train of more than two parts, a layshaft train, roller bearings between the parts of said trains, said bearings being capable of transmitting axial thrusts corresponding to compression of the train parts, but not thrusts in the reverse direction, a thrust-absorbing bearing at each end of each train, dog clutches for coupling together the parts of said trains, and a pair of obliquely toothed gear wheels in constant mesh, one of said wheels being mounted on an intermediate part of the mainshaft train and the other in the layshaft train, the teeth of said gear wheels being so directed that when the wheels are rotating in their normal directions and the mainshaft wheel is the driving wheel the thrust of the said wheel is directed towards the end of the mainshaft train intended to receive the normal driving torque.

2. In a change speed gear of the kind comprising a train of shaft parts, dog clutches for coupling together the parts of said train, and a number of pairs of obliquely toothed gear wheels in constant mesh, one wheel of each pair being mounted on one of said train parts: two adjacent train parts having an antifriction bearing between them which is capable of transmitting axial thrust in one direction only, and an obliquely toothed wheel mounted on one of said adjacent train parts and having the direction of its teeth such that when the clutch between the said adjacent train parts is engaged, and power is being transmitted through the change speed gear in the normal direction, any axial thrust from the said wheel acts upon the train part on which the wheel is mounted in the same direction as that in which the said bearing is capable of transmitting thrust from the train part on which the wheel is mounted to the adjacent train part.

3. In a change speed gear of the kind comprising a train of mainshaft parts, dog clutches for coupling together the parts of said train, and a number of pairs of obliquely toothed gear wheels in constant mesh, one wheel of each pair being mounted on one of said mainshaft-train parts; two adjacent mainshaft-train parts having an antifriction bearing between them which is capable of transmitting axial thrust in one direction only, and an obliquely toothed wheel mounted on one of said adjacent mainshaft-train parts and having the direction of its teeth such that when the clutch between the said adjacent train parts is engaged, and power is being transmitted through the change speed gear in the normal direction, any axial thrust from the said wheel acts upon the train part on which the wheel is mounted in the same direction as that in which the said bearing is capable of transmitting thrust from the train part on which the wheel is mounted to the adjacent train part.

4. In a change speed gear of the kind comprising a train of layshaft parts, dog clutches for coupling together the parts of said train, and a number of pairs of obliquely toothed gear wheels in constant mesh, one wheel of each pair being mounted on one of said layshaft-train parts; two adjacent layshaft-train parts having an antifriction bearing between them which is capable of transmitting axial thrust in one direction only, and an obliquely toothed wheel mounted on one of said adjacent layshaft-train parts and having the direction of its teeth such that when the clutch between the said adjacent train parts is engaged, and power is being transmitted through the change speed gear in the normal direction, any axial thrust from the said wheel acts upon the train part on which the wheel is mounted in the same direction as that in which the said bearing is capable of transmitting thrust from the train part on which the wheel is mounted to the adjacent train part.

5. In a change speed gear, an intermediate shaft part the ends of which project into recesses formed in the adjacent shaft parts, antifriction bearings between said shaft parts capable of transmitting axial thrusts in one direction only, dog clutches for coupling together said shaft parts, and a pair of obliquely toothed gear wheels in constant mesh, one of said wheels being mounted on said intermediate shaft part, the teeth of said gear wheels being so directed that when two of said shaft parts are coupled by the engagement of the dog clutch between them and power is being transmitted through the change speed gear in the normal direction, any axial thrust from the gear wheel mounted on said intermediate shaft part acts in the same direction as that in which the antifriction bearing between the coupled shaft parts is capable of transmitting thrust from said intermediate shaft part to the adjacent shaft part.

6. In a change speed gear, an intermediate shaft part recessed to receive the ends of the adjacent shaft parts, antifriction bearings between said shaft parts capable of transmitting axial thrust in one direction only, dog clutches for coupling together said shaft parts, and a pair of obliquely toothed gear wheels in constant mesh, one of said wheels being mounted on said intermediate shaft part, the teeth of said gear wheels being so directed that when two of said shaft parts are coupled by the engagement of the dog clutch between them and power is being transmitted through the change speed gear in the normal direction, any axial thrust from the gear wheel mounted on said intermediate shaft part acts in the same direction as that in which the antifriction bearing between the coupled shaft parts is capable of transmitting thrust from said intermediate shaft part to the adjacent shaft part.

7. In a change speed gear, an intermediate shaft part recessed at one end to receive the end of one of the adjacent shaft parts and projecting at its other end into a recess in the other adjacent shaft part, antifriction bearings between said shaft parts capable of transmitting axial thrusts in one direction only, dog clutches for coupling together said shaft parts, and a pair of obliquely toothed gear wheels in constant mesh, one of said wheels being mounted on said intermediate shaft part, the teeth of said gear wheels being so directed that when two of said shaft parts are coupled by the engagement of the dog clutch between them and power is being transmitted through the change speed gear in the normal direction, any axial thrust from the gear wheel mounted on said intermediate shaft part acts in the same direction as that in which the antifriction bearing between the coupled shaft parts is capable of transmiting thrust from said intermediate shaft part to the adjacent shaft part.

8. In a change speed gear, a mainshaft train of more than two parts, a layshaft train, antifriction bearings between the parts of said trains capable of transmitting axial thrusts in one direction only, a thrust absorbing bearing at each end of each train, dog clutches for coupling together the parts of said trains, and a pair of obliquely toothed gear wheels in constant mesh, one of said wheels being mounted on an intermediate part of the mainshaft train and the other in the layshaft train, the teeth of said gear wheels being so directed in relation to the thrust transmitting directions of said antifriction bearings that when said intermediate mainshaft part is coupled to one of the adjacent mainshaft parts by the engagement of the dog clutch between them and power is being transmitted through the change speed gear in the normal direction, any axial thrust from the gear wheel mounted on said intermediate mainshaft part acts in the same direction as that in which the antifriction bearing between the coupled shaft parts is capable of transmitting thrust from said intermediate mainshaft part to the adjacent mainshaft part.

9. In a change speed gear, a layshaft train of more than two parts, a mainshaft train, antifriction bearings between the parts of said trains capable of transmitting axial thrusts in one direction only, a thrust absorbing bearing at each end of each train, dog clutches for coupling together the parts of said trains, and a pair of obliquely toothed gear wheels in constant mesh, one of said wheels being mounted on an intermediate part of the layshaft train and the other in the mainshaft train, the teeth of said gear wheels being so directed in relation to the thrust transmitting directions of said antifriction bearings that when said intermediate layshaft part is coupled to one of the adjacent layshaft parts by the engagement of the dog clutch between them and power is being transmitted through the change speed gear in the normal direction, any axial thrust from the gear wheel mounted on said intermediate layshaft part acts in the same direction as that in which the antifriction bearing between the coupled shaft parts is capable of transmitting thrust from said intermediate layshaft part to the adjacent layshaft part.

10. In a change speed gear, a mainshaft train of more than two parts, a layshaft train, antifriction bearings between the parts of said trains capable of transmitting axial thrusts in one direction only, a thrust absorbing bearing at each end of each train, dog clutches for coupling together the parts of said trains, and a pair of obliquely toothed gear wheels in constant mesh, one of said wheels being mounted on an intermediate part of the mainshaft train and the other on an intermediate part of the layshaft train, the teeth of said gear wheels being so directed in relation to the thrust transmitting directions of said antifriction bearings that when said intermediate mainshaft part is coupled to either of the adjacent mainshaft parts by the engagement of the dog clutch between them and said intermediate layshaft part is coupled to either of the adjacent layshaft parts by the engagement of the dog clutch between them, said engaged dog clutches lying on opposite sides of the plane of the gear wheels mounted on said intermediate shaft parts, and power is being transmitted through the change speed gear in the normal direction, any axial thrust from the gear wheels mounted on said intermediate shaft parts acts on the shaft part carrying the respective gear wheel in the same direction as that in which the antifriction bearing between said last-mentioned shaft part and the adjacent shaft part coupled to it is capable of transmitting thrust from the intermediate shaft part to the adjacent shaft part.

11. In a change speed gear, a pair of obliquely toothed gear wheels in constant mesh, one of said wheels being rigidly mounted on a shaft part journalled at one end in an antifriction bearing carried by an adjacent shaft part and capable of transmitting axial thrusts in one direction only, and a dog clutch for coupling together said shaft parts, the teeth of said gear wheels being so directed that when said shaft parts are so coupled and power is being transmitted through the change-speed gear in the normal direction, any axial thrust from the gear wheel mounted on the shaft part which is journalled at one end in said antifriction bearing acts in the same direction as that in which said antifriction bearing is capable of transmitting thrust to said adjacent shaft part.

12. In a change-speed gear, a pair of obliquely toothed gear wheels in constant mesh, one of said wheels being rigidly mounted on a shaft part carrying an antifriction bearing capable of transmitting axial thrusts in one direction only, an adjacent shaft part journalled at one end in said antifriction bearing, and a dog clutch for coupling together said shaft parts, the teeth of said gear wheels being so directed that when said shaft parts are so coupled and power is being transmitted through the change-speed gear in the normal direction, any axial thrust from the gear wheel mounted on the shaft part carrying said antifriction bearing acts in the same direction as that in which said antifriction bearing is capable of transmitting thrust to said adjacent shaft part.

13. In a change speed gear, a pair of obliquely toothed gear wheels in constant mesh, one of said wheels being rigidly mounted on a shaft part journalled at one end in an antifriction bearing carried by an adjacent shaft part and capable of transmitting axial thrusts in one direction only and also journalled in a bearing mounted directly in the casing, and a dog clutch for coupling together said shaft parts, the teeth of said gear wheels being so directed that when said shaft parts are so coupled and power is being transmitted through the change-speed gear in the normal direction, any axial thrust from the gear wheel mounted on the shaft part which is journalled at one end in said antifriction bearing acts in the same direction as that in which said antifriction bearing is capable of transmitting thrust to said adjacent shaft part.

14. In a change-speed gear, a pair of obliquely toothed gear wheels in constant mesh, one of said wheels being rigidly mounted on a shaft part journalled in bearings mounted directly in the casing and carrying an antifriction bearing capable of transmitting axial thrusts in one direction only, an adjacent shaft part journalled at one end in said antifriction bearing, and a dog clutch for coupling together said shaft parts, the teeth of said gear wheels being so directed that when said shaft parts are so coupled and power is being transmitted through the change speed gear in the normal direction, any axial thrust from the gear wheel mounted on the shaft part carrying said antifriction bearing acts in the same direction as that in which said antifriction bearing is capable of transmitting thrust to said adjacent shaft part.

GUSTAV MEYER.